(12) United States Patent
Igarashi et al.

(10) Patent No.: US 10,443,716 B2
(45) Date of Patent: Oct. 15, 2019

(54) ABNORMALITY DETECTION FOR HYDRAULIC CIRCUIT AND ABNORMALITY DETECTION METHOD FOR HYDRAULIC CIRCUIT

(71) Applicant: FUJI JUKOGYO KABUSHIKI KAISHA, Tokyo (JP)

(72) Inventors: Masato Igarashi, Tokyo (JP); Sho Yoshida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 15 days.

(21) Appl. No.: 15/367,420

(22) Filed: Dec. 2, 2016

(65) Prior Publication Data

US 2017/0248225 A1 Aug. 31, 2017

(30) Foreign Application Priority Data

Feb. 25, 2016 (JP) ................................ 2016-034539

(51) Int. Cl.
*F16H 61/12* (2010.01)
*F16H 61/00* (2006.01)
*F16H 61/662* (2006.01)

(52) U.S. Cl.
CPC ......... *F16H 61/12* (2013.01); *F16H 61/0025* (2013.01); *F16H 61/662* (2013.01);
(Continued)

(58) Field of Classification Search
USPC ...................................................... 701/29.2
See application file for complete search history.

(56) References Cited

U.S. PATENT DOCUMENTS 3,644,883 A * 2/1972 Borman .................. G08G 1/127
340/991
4,393,732 A * 7/1983 Suzuki .................... F16H 61/12
477/125
(Continued)

FOREIGN PATENT DOCUMENTS

JP    2010-242530    10/2010
JP    2013-096540    5/2013

OTHER PUBLICATIONS

Translation of Japanese Patent Pub. No. JP,2013-096540,A (2013).*
(Continued)

*Primary Examiner* — Jean Paul Cass
(74) *Attorney, Agent, or Firm* — Smith, Gambrell & Russell, LLP

(57) ABSTRACT

An abnormality detection device for a hydraulic circuit including an oil pump, a switching unit switching between a fully discharged state and a partial discharge, a pressure regulator, a pressure regulation controller and a hydraulic detector, The device includes: a storage storing a maximum discharge pressure of oil capable of being discharged in the partially discharged state; a switching controller performing control of switching into the fully discharged state; and a determination unit determining that the switching unit has a fixation abnormality of the partially discharged state when a hydraulic pressure approximately corresponds to the maximum discharge pressure in the partially discharged state in a state where a hydraulic pressure higher than the maximum discharge pressure in the partially discharged state is set as a target hydraulic pressure and the pressure regulator is controlled in an effort to achieve the target hydraulic pressure after the switching control.

21 Claims, 5 Drawing Sheets

(52) U.S. Cl.
CPC ............... *F16H 2061/1208* (2013.01); *F16H 2061/1264* (2013.01); *F16H 2061/66286* (2013.01)

(56) References Cited

U.S. PATENT DOCUMENTS

| | | | | | |
|---|---|---|---|---|---|
| 4,967,621 | A | * | 11/1990 | Soga | B60W 30/18 477/45 |
| 5,684,859 | A | * | 11/1997 | Chanroo | H04M 11/022 340/7.21 |
| 5,743,089 | A | | 4/1998 | Tohji | |
| 5,819,194 | A | * | 10/1998 | Hara | B60K 23/0808 701/89 |
| 6,055,413 | A | * | 4/2000 | Morse | H04L 12/1895 340/7.43 |
| 6,792,282 | B1 | * | 9/2004 | Domino | H03G 3/3047 455/102 |
| 6,795,712 | B1 | * | 9/2004 | Vakilian | H03F 1/0211 370/335 |
| 7,893,758 | B2 | * | 2/2011 | Parsa | H04L 27/364 329/358 |
| 8,558,552 | B2 | * | 10/2013 | Chappell | H04B 3/46 324/534 |
| 9,002,619 | B2 | * | 4/2015 | Ito | F02B 29/083 701/103 |
| 9,087,451 | B1 | * | 7/2015 | Jarrell | G08G 5/0069 |
| 9,274,521 | B1 | * | 3/2016 | Stefani | G08G 5/0026 |
| 9,620,024 | B1 | * | 4/2017 | Mottram | G01S 5/0027 |
| 9,621,203 | B2 | * | 4/2017 | Rada | G01M 3/00 |
| 9,645,229 | B2 | * | 5/2017 | Jales | G01S 5/062 |
| 9,684,807 | B2 | * | 6/2017 | Brown | H03D 3/00 |
| 9,685,087 | B2 | * | 6/2017 | Berckefeldt | G08G 5/0078 |
| 2002/0135442 | A1 | * | 9/2002 | Sawada | H03H 9/0071 333/195 |
| 2002/0162457 | A1 | * | 11/2002 | Hyodo | F02M 25/089 96/109 |
| 2002/0167378 | A1 | * | 11/2002 | Sawada | H03H 9/0071 333/193 |
| 2002/0177425 | A1 | * | 11/2002 | Li | H03D 7/18 455/296 |
| 2003/0096586 | A1 | * | 5/2003 | Oates | G01S 7/021 455/226.1 |
| 2004/0012517 | A1 | * | 1/2004 | Abou-Jaoude | G01S 7/4052 342/165 |
| 2004/0066254 | A1 | * | 4/2004 | Shibahara | H03H 9/0038 333/195 |
| 2004/0077325 | A1 | * | 4/2004 | Takamine | H03H 9/0071 455/286 |
| 2004/0083409 | A1 | * | 4/2004 | Rozenblit | H03F 1/0211 714/48 |
| 2004/0198301 | A1 | * | 10/2004 | Rozenblit | H03G 3/004 455/343.1 |
| 2005/0011742 | A1 | * | 1/2005 | Yamamoto | B01D 1/0017 203/1 |
| 2007/0088560 | A1 | * | 4/2007 | Mock | H04M 1/72555 340/539.13 |
| 2007/0132889 | A1 | * | 6/2007 | Pan | H03D 7/145 348/726 |
| 2007/0140195 | A1 | * | 6/2007 | Kaftan | H04L 29/1233 370/338 |
| 2007/0242158 | A1 | * | 10/2007 | Pugel | H04B 1/28 348/554 |
| 2007/0298838 | A1 | * | 12/2007 | Meiyappan | H04B 1/0057 455/553.1 |
| 2008/0107093 | A1 | * | 5/2008 | Meiyappan | H04B 1/1036 370/339 |
| 2008/0155376 | A1 | * | 6/2008 | Williams | H04L 1/0045 714/760 |
| 2009/0077608 | A1 | * | 3/2009 | Romerein | H03H 7/463 725/127 |
| 2009/0141183 | A1 | * | 6/2009 | Ecoff | H03F 1/26 348/731 |
| 2009/0181722 | A1 | * | 7/2009 | Stensson | H01Q 1/246 455/562.1 |
| 2009/0231169 | A1 | * | 9/2009 | Mittal | H03M 7/3082 341/51 |
| 2009/0285135 | A1 | * | 11/2009 | Rousu | H04B 1/0057 370/297 |
| 2009/0286478 | A1 | * | 11/2009 | Biber | G01R 33/3607 455/41.2 |
| 2010/0004801 | A1 | * | 1/2010 | Flotte | G05D 1/0646 701/8 |
| 2011/0203682 | A1 | | 8/2011 | Ishikawa et al. | |
| 2013/0224044 | A1 | * | 8/2013 | Maruoka | F04B 1/20 417/269 |
| 2014/0136414 | A1 | * | 5/2014 | Abhyanker | G06Q 50/28 705/44 |
| 2014/0318411 | A1 | * | 10/2014 | Ogawa | B61F 5/245 105/199.2 |
| 2015/0247914 | A1 | * | 9/2015 | Rothacher | G01S 13/103 701/301 |
| 2016/0017990 | A1 | | 1/2016 | Yoshimura | |
| 2016/0312442 | A1 | * | 10/2016 | Egawa | E02F 9/2075 |
| 2016/0312443 | A1 | * | 10/2016 | Egawa | E02F 9/123 |
| 2017/0069214 | A1 | * | 3/2017 | Dupray | G08G 5/0021 |

OTHER PUBLICATIONS

Translation of Japanese Patent Pub. No. JP,2010-242530,A (2010).*
Japanese Office Action dated Aug. 8, 2017, in JP Patent Application No. 2016-034539 (6 pages in Japanese with English Translation).

* cited by examiner

ABNORMALITY DETECTION FOR HYDRAULIC CIRCUIT AND ABNORMALITY DETECTION METHOD FOR HYDRAULIC CIRCUIT

CROSS-REFERENCE TO RELATED APPLICATIONS

The present application claims priority from Japanese Patent Application No. 2016-034539 filed on Feb. 25, 2016, the entire contents of which are hereby incorporated by reference.

BACKGROUND

1. Technical Field

The present invention relates to an abnormality detection device for a hydraulic circuit and an abnormality detection method for the hydraulic circuit.

2. Related Art

In a hydraulic circuit for a vehicle automatic transmission (for example, CVT (Continuously Variable Transmission), a pressure of oil discharged from an oil pump driven by the power of an engine is regulated, and the regulated oil is supplied. In recent years, the load of the oil pump is required to be reduced for satisfying the request of improving the fuel consumption of the vehicle. As a technique for reducing the load of the oil pump, for example, there is a technique of the oil pump having two discharge ports, which performs switching between a fully discharged state in which oil is discharged from two discharge ports and a partially discharged state in which oil is discharged from one discharge port. As a unit of switching the discharge state, for example, a spool valve and a solenoid valve which moves the spool valve are used.

However, in the case where the discharge state of the oil pump is fixed to the partially discharged state and it is difficult to switch the state to the fully discharged state, there is a danger that an oil discharge amount is short and proper change gear control is inhibited. In order to detect the fixation of the partially discharged state, for example, there is disclosed in Japanese Unexamined Patent Application Publication (JP-A) No. 2013-96540 that it is determined that the oil pump is fixed in the partial capacity operation state (partially discharged state) in the case where an actual gear ratio is lower than a threshold for determining the fixation when the stop of the vehicle is determined.

In the method of determining the fixation disclosed in JP-A No. 2013-96540, it is assumed that the oil pump is fixed in the partially discharged state when the gear ratio is not fully returned to "low" while the vehicle is stopped. However, the state where the gear ratio is not fully returned to "low" while the vehicle is stopped may be caused by other factors such as an abnormality in the automatic transmission besides the fixation of the oil pump. Accordingly, the fixation of the oil pump may be wrongly determined in the method of determining the fixation disclosed in JP-A No. 2013-96540. Moreover, the fixation can be determined only when the vehicle is stopped in the method of determining the fixation disclosed in JP-A No. 2013-96540.

SUMMARY OF THE INVENTION

It is desirable to provide an abnormality detection device for a hydraulic circuit and an abnormality detection method of the hydraulic circuit capable of accurately detecting the fixation of the partially discharged state in the switching unit which performs switching between the fully discharged state and the partially discharged state of the oil pump.

An aspect of the present invention provides an abnormality detection device for a hydraulic circuit having an oil pump capable of increasing a pressure of oil sucked through a suction port and discharging the oil through discharge ports, a switching unit that switches between a fully discharged state where oil is discharged to an oil passage through all the discharge ports and a partially discharged state where oil is discharged to the oil passage through part of the discharge ports, a pressure regulator that regulates a pressure of oil discharged in the oil passage in either one of the discharge states switched by the switching unit, a pressure regulation controller that controls the pressure regulation of the pressure regulator and a hydraulic detector that detects a hydraulic pressure regulated by the pressure regulator. The device includes: a storage that stores a maximum discharge pressure of oil capable that is allowed to be discharged in the partially discharged state; a switching controller that performs switching control to switch to the fully discharged state by the switching unit; and a determination unit that determines that the switching unit has a fixation abnormality of the partially discharged state when a hydraulic pressure detected by the hydraulic detector approximately corresponds to the maximum discharge pressure in the partially discharged state in a state where, after the switching control performed by the switching control unit, the pressure regulation controller sets a target hydraulic pressure to a hydraulic pressure higher than the maximum discharge pressure in the partially discharged state stored in the storage, and performs pressure regulation control on the pressure regulator in an effort to achieve the target hydraulic pressure.

The storage may store a maximum discharge pressure of oil that is allowed to be discharged in the fully discharged state. The determination unit may determine that the switching unit has a fixation abnormality in the partially discharged state when a hydraulic pressure detected by the hydraulic detector approximately corresponds to the maximum discharge pressure in the partially discharged state in a state where the pressure regulation controller sets the target hydraulic pressure to a hydraulic pressure between the maximum discharge pressure in the partially discharged state stored in the storage and the maximum discharge pressure in the fully discharged state stored in the storage and performs pressure regulation control on the pressure regulator in an effort to achieve the target hydraulic pressure.

The determination unit may determine that the switching unit has a fixation abnormality of the partially discharged state when, in a state where the pressure regulation controller sets a first target hydraulic pressure higher than the maximum discharge pressure in the partially discharged state at a first discharge amount of the oil pump, and performs the pressure regulation control on the pressure regulator in an effort to achieve the first target hydraulic pressure, a hydraulic pressure detected by the hydraulic detector approximately corresponds to the maximum discharge pressure in the partially discharged state at the first discharge amount as well as when, in a state where the pressure regulation controller sets a second target hydraulic pressure higher than the maximum discharge pressure in the partially discharged state at a second discharge amount different from the first discharge amount by a prescribed amount is set and performs the pressure regulation control on the pressure regulator in an effort to achieve the second target hydraulic pressure, a hydraulic pressure detected by the hydraulic detector approximately corresponds to the maximum discharge pressure in the partially discharged state at the second discharge amount.

The hydraulic circuit may be a hydraulic circuit mounted on a vehicle that uses an engine as a drive source. The oil pump may have a maximum discharge pressure characteristic indicating the maximum discharge pressure in the partially discharged state, which varies according to a number of engine revolutions. The storage may store the maximum discharge pressure characteristic in the partially discharged state, which varies according to the number of engine revolutions. The determination unit may determine that the switching unit has a fixation abnormality of the partially discharged state when, in a state where the pressure regulation controller sets a first target hydraulic pressure higher than the maximum discharge pressure in the partially discharged state at a first number of engine revolutions acquired from the maximum discharge pressure characteristic in the partially discharged state stored in the storage, and performs the pressure regulation control on the pressure regulator in an effort to achieve the first target hydraulic pressure, a hydraulic pressure detected by the hydraulic detector approximately corresponds to the maximum discharge pressure in the partially discharged state at the first number of engine revolutions, as well as when, in a state where the pressure regulation controller sets a second target hydraulic pressure higher than the maximum discharge pressure in the partially discharged state at a second number of engine revolutions different from the first number of engine revolutions by a prescribed number of engine revolutions, which is acquired from the maximum discharge pressure characteristic in the partially discharged state stored in the storage, and performs the pressure regulation control on the pressure regulator in an effort to achieve the second target hydraulic pressure, a hydraulic pressure detected by the hydraulic detector approximately corresponds to the maximum discharge pressure in the partially discharged state at the second number of engine revolutions.

The switching unit may include a solenoid valve and a spool valve, which may switch between the fully discharged state and the partially discharged state by opening/closing the spool valve by a control pressure supplied from the solenoid valve. The determination unit may determine whether at least one of the solenoid valve or the spool valve has a fixation abnormality of the partially discharged state.

The switching controller may perform the switching control to switch to the fully discharged state at prescribed timing for making a determination of the fixation abnormality of the partially discharged state by the determination unit. The pressure regulation controller may perform the pressure regulation control so that the hydraulic pressure reaches the target hydraulic pressure higher than the maximum discharge pressure in the partially discharged state, after the switching control.

An aspect of the present invention provides an abnormality detection method for a hydraulic circuit having an oil pump capable of increasing a pressure of oil sucked through a suction port and discharging the oil through discharge ports, a switching unit that switches between a fully discharged state where oil is discharged to an oil passage through all the discharge ports and a partially discharged state where oil is discharged to the oil passage through part of the discharge ports, a pressure regulator that regulates a pressure of oil discharged in the oil passage in either of the discharge states switched by the switching unit, a pressure regulation controller that controls the pressure regulation of the pressure regulator and a hydraulic detector that detects a hydraulic pressure regulated by the pressure regulator. The method includes performing switching control to switch to the fully discharged state by the switching unit, and determining that the switching unit has a fixation abnormality of the partially discharged state when a hydraulic pressure detected by the hydraulic detector approximately corresponds to the maximum discharge pressure in the partially discharged state in a state where, after the switching control performed by the switching control unit, the pressure regulation controller sets a target hydraulic pressure to a hydraulic pressure higher than the maximum discharge pressure in the partially discharged state stored in the storage, and performs pressure regulation control on the pressure regulator in an effort to achieve the target hydraulic pressure.

DETAILED DESCRIPTION

Figure 1:
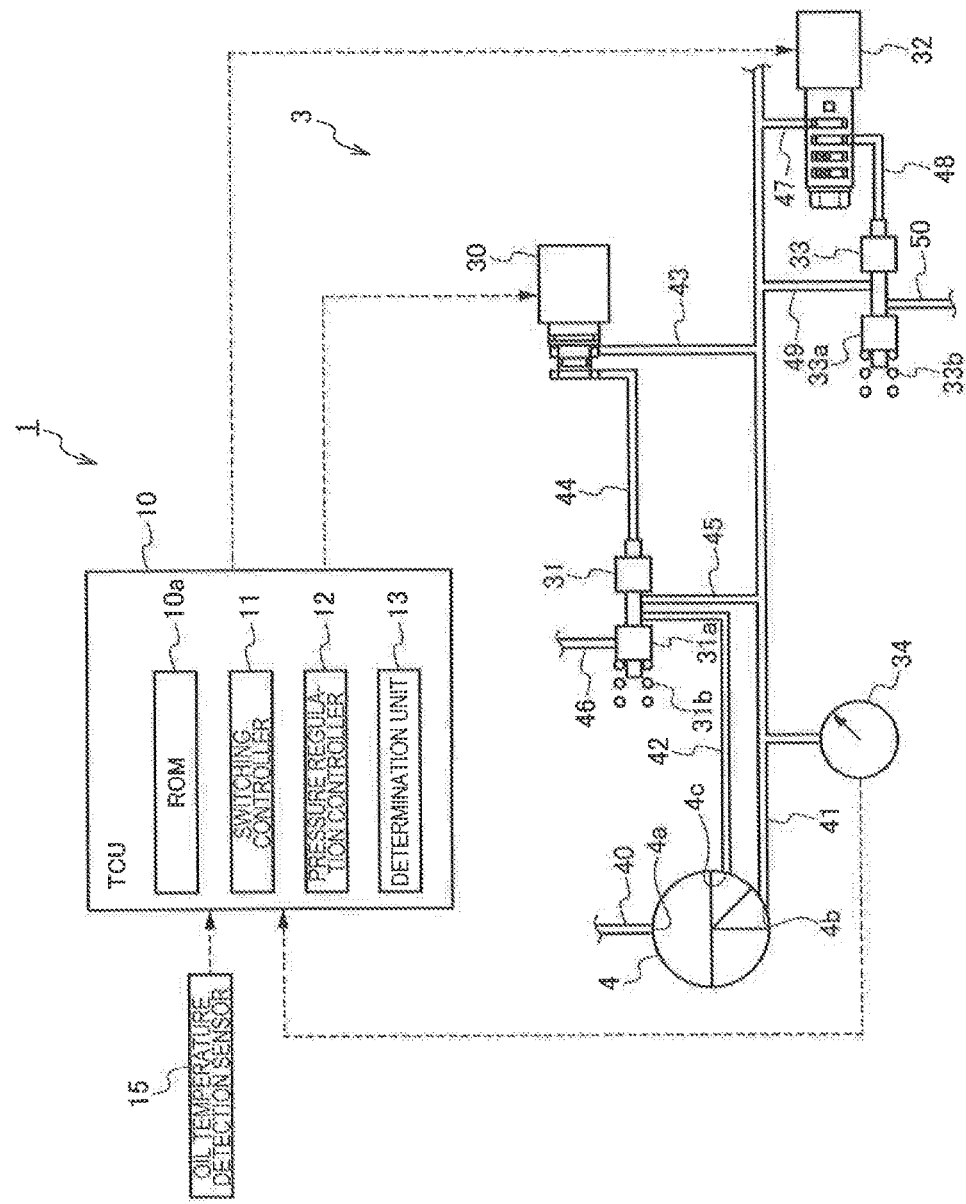
FIG. 1 schematically illustrates a structure of an abnormality detection device and a hydraulic circuit according to an example.

Hereinafter, a preferred example of the present invention will be explained with reference to the drawings. In the drawings, the same symbols are used for the same or corresponding parts in the drawings. Also in the drawings, the same symbols are added to the same components and repeated explanation is omitted.

An example is applied to an abnormality detection device which detects an abnormality of a hydraulic circuit in a chain-type CVT (Continuously Variable Transmission) mounted on a vehicle using an engine as a drive source. The hydraulic circuit according to the example includes an oil pump having two discharge ports, performing switching of the operation state of the oil pump between a fully discharged state (in one implementation, the fully discharged state may serve as a "fully discharged state") in which oil is discharged from two discharge ports and a half discharge state (in one implementation, the half discharge state may serve as a "partially discharged state") in which oil is discharged from one discharge port, and regulating a discharge pressure of oil discharged in either of the discharge states into a prescribed line pressure (in one implementation, the line pressure may serve as a "hydraulic pressure"). As the state where oil is discharged from one discharge port out of two discharge ports is defined as the partially discharged state in the example, the partially discharged state will be called the "half discharge state".

Figure 2:
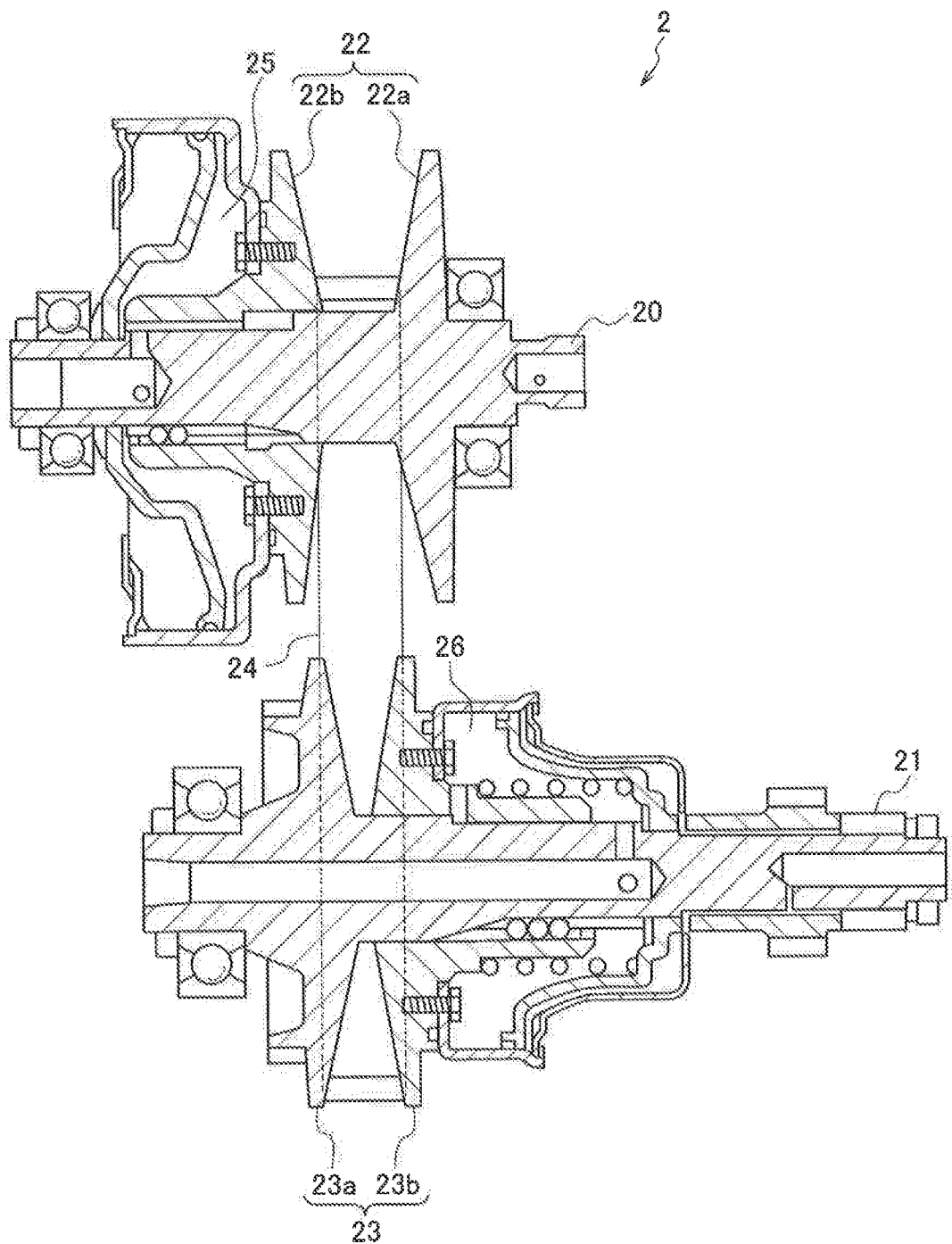
FIG. 2 is a cross-sectional view illustrating a structure of a CVT which adopts the abnormality detection device according to the example.

An abnormality detection device 1 of a hydraulic circuit according to the example will be explained with reference to FIG. 1 and FIG. 2. FIG. 1 schematically illustrates a structure of the abnormality detection device and the hydraulic circuit according to the example. FIG. 2 is a cross-sectional view illustrating a structure of the CVT which adopts the abnormality detection device according to the example.

A CVT 2 and a hydraulic circuit 3 will be explained prior to the explanation of the abnormality detection device 1. The CVT 2 is, for example, coupled to a crank shaft of an engine (not shown) through a torque converter (not shown), which converts a drive force from the engine and outputs the drive force. The CVT 2 includes a primary shaft (input shaft) 20 coupled to an output shaft of the torque converter and a secondary shaft (output shaft) 21 disposed in parallel to the primary shaft 20.

The primary shaft 20 is provided with a primary pulley 22. The primary pulley 22 includes a fixed pulley 22a and a movable pulley 22b. The fixed pulley 22a is joined to the primary shaft 20. The movable pulley 22b faces the fixed pulley 22a and is attached so as to slide freely and so as not to relatively rotate in an axial direction of the primary shaft 20. The primary pulley 22 is configured to change an interval of cone surfaces (namely, a pulley groove width) between the fixed pulley 22a and the movable pulley 2b.

The secondary shaft 21 is provided with a secondary pulley 23. The secondary pulley 23 includes a fixed pulley 23a and a movable pulley 23b. The fixed pulley 23a is joined to the secondary shaft 21. The movable pulley 23b faces the fixed pulley 23a and is attached so as to slide freely and so as not to relatively rotate in an axial direction of the secondary shaft 21. The secondary pulley 23 is configured to change the pulley groove width between the fixed pulley 23a and the movable pulley 23b.

A chain 24 which transmits the drive force is hung over the primary pulley 22 and the secondary pulley 23. The CVT 2 continuously varies the gear ratio by changing respective pulley groove widths of the primary pulley 22 and the secondary pulley 23 to change the ratio (pulley ratio) of winding diameters of the chain 24 with respect to the respective pulleys 22 and 23. When the winding diameter of the chain 24 with respect to the primary pulley 22 is Rp, and the winding diameter with respect to the secondary pulley 23 is Rs, the gear ratio "i" is represented by i=Rs/Rp.

The movable pulley 22b of the primary pulley 22 includes a primary driving oil chamber (hydraulic cylinder chamber) 25. The movable pulley 23b of the secondary pulley 23 includes a secondary driving oil chamber (hydraulic cylinder chamber) 26. A gear pressure for changing the pulley ratio and a pulley pressure (clamp pressure) for preventing slipping of the chain 24 are led into the primary driving oil chamber 25. A pulley pressure (the same pulley pressure as the pulley pressure led into the primary driving oil chamber 25) is led into the secondary driving oil chamber 26. The pulley pressures and the gear pressure are led by regulating a line pressure generated in the hydraulic circuit 3.

The hydraulic circuit 3 will be explained. Oil is supplied to the hydraulic circuit 3 from an oil pump 4. The hydraulic circuit 3 switches the discharge state of oil discharged from the oil pump 4 between the fully discharged state and the half discharge state. The hydraulic circuit 3 further regulates a discharge pressure of oil discharged in either of the discharge states to the line pressure. The hydraulic circuit 3 is a hydraulic circuit forming a part of a valve body. A control valve mechanism is incorporated in the valve body (hydraulic circuit 3). The control valve mechanism changes the hydraulic pressure by opening and closing an oil passage formed in the valve body using plural spool valves and solenoid valves (electromagnetic valves) which move the spool valves. The valve body also includes, for example, a hydraulic circuit supplying the pulley pressure to the primary driving oil chamber 25 and the secondary driving oil chamber 26 by using the line pressure generated in the hydraulic circuit 3, a hydraulic circuit supplying the gear pressure to the primary driving oil chamber 25, a hydraulic circuit supplying a hydraulic pressure to a forward/backward travel switching mechanism which switches forward/backward travel of the vehicle and so on in addition to the hydraulic circuit 3.

The oil pump 4 is driven by the power of the engine, sucking oil pooled in an oil pan (not shown) and discharging the oil with an increased high pressure to the hydraulic circuit 3. The oil pump 4 is, for example, a trochoid pump. The oil pump 4 includes one suction port 4a and two discharge ports (a first discharge port 4b and a second discharge port 4c). An oil passage 40 communicating with the oil pan is coupled to the suction port 4a. An oil passage 41 for the line pressure is coupled to the first discharge port 4b. An oil passage 42 communicating with a switching valve 31 is couple to the second discharge port 4c.

The hydraulic circuit 3 includes a switching solenoid valve 30 (in one implementation, the switching solenoid valve 30 may serve as a "solenoid valve (a switching unit)"), the switching valve 31 (in one implementation, the switching valve 31 may serve as a "spool valve (the switching unit)"), a line pressure solenoid valve 32 (in one implementation, the line pressure solenoid valve 32 may serve as a "pressure regulator"), a line pressure valve 33 (in one implementation, the line pressure valve 33 may serve as the "pressure regulator") and a line pressure detection sensor 34 (in one implementation, the line pressure detection sensor 34 may serve as a "hydraulic detector").

The hydraulic circuit 3 switches the discharge state of the oil pump 4 between the fully discharged state and the half-discharge state by the switching solenoid valve 30 and the switching valve 31 switching controlled by a later-described TCU (Transmission Control Unit) 10.

The switching solenoid valve 30 is an on/off solenoid valve. An oil passage 43 communicating with the oil passage 41 and an oil passage 44 communicating with the switching valve 31 are coupled to the switching solenoid valve 30. The switching solenoid valve 30 is coupled to the TCU 10. The switching solenoid valve 30 is turned on when a prescribed electric current is supplied from the TCU 10 and is turned off when the supply of electric current is stopped. When the switching solenoid valve 30 is turned on, the valve generates a switching control pressure by using the oil supplied through the oil passage 43 and supplies the switching control pressure to the switching valve 31 through the oil path 44. When the switching solenoid valve 30 is turned off, the supply of the switching control pressure to the switching valve 31 is stopped.

The switching valve 31 is a spool valve, including a spool 31a sliding in the axial direction and a spring 31b disposed on one end side of the spool 31a. The oil passage 42 communicating with the second discharge port 4c of the oil pump 4, the oil passage 44 communicating with the switching solenoid valve 30, an oil passage 45 communicating with the oil passage 41 and an oil passage 46 for exhausting oil are coupled to the switching valve 31. In the switching valve 31, the driving (position) of the spool 31a in the axial direction is controlled in accordance with whether the switching control pressure is supplied from the switching solenoid valve 30 or not. That is, the spool 31a of the switching valve 31 is driven in the axial direction in accordance with the balance between a pushing force (switching control pressure×pressure receiving area) caused by the switching control pressure supplied through the oil passage 44 (note that the switching control pressure is stopped when the switching solenoid valve 30 is off) and a spring force (biasing force) of the spring 31*b*.

When the switching control pressure is supplied from the switching solenoid valve 30 in the switching valve 31, the spool 31*a* moves so that the oil passage 42 communicates with the oil passage 46. In this case, the operation state will be the half discharge state in which oil discharged from the second discharge port 4*c* of the oil pump 4 to the oil passage 42 is exhausted through the oil passage 46, and oil is discharged to the oil passage 41 only from the first discharge port 4*b* of the oil pump 4. Accordingly, the load of the oil pump 4 is reduced and the fuel consumption of the vehicle is improved. On the other hand, when the supply of the switching control pressure from the switching solenoid valve 30 is stopped in the switching valve 31, the spool 31*a* moves so that the oil passage 42 communicates with the oil passage 45. In this case, the operation state will be the fully discharged state in which the oil discharged from the second discharge port 4*c* of the oil pump 4 to the oil passage 42 flows into the oil passage 41 through the oil passage 45, and oil is discharged from the first discharge port 4*b* and the second discharge port 4*c* of the oil pump 4 to the oil passage 41. In the case of the fully discharged state, a larger amount of oil is discharged as compared with the half discharge state, therefore, the discharge pressure can be higher than the case of the half discharge state.

In the hydraulic circuit 3, the pressure of oil discharged in either discharge state (the fully discharged state or the half discharge state) is regulated into a prescribed line pressure by the line pressure solenoid valve 32 and the line pressure valve 33 the pressure of which is regulated by the TCU 10.

The line pressure solenoid valve 32 is a linear solenoid valve. An oil passage 47 communicating with the oil passage 41 and an oil passage 48 communicating with the line pressure valve 33 are coupled to the line pressure solenoid valve 32. The line pressure solenoid valve 32 is coupled to the TCU 10. In the line pressure solenoid valve 32, the driving (position) in the axial direction of a plunger is controlled in accordance with a current value supplied from the TCU 10 to change a line pressure control pressure. The line pressure solenoid valve 32 supplies the line pressure control pressure to the line pressure valve 33 through the oil passage 48.

The line pressure valve 33 is a spool valve, including a spool 33*a* sliding in the axial direction and a spring 33*b* disposed on one end side of the spool 33*a*. The oil passage 48 communicating with the line pressure solenoid valve 32, an oil passage 49 communicating with the oil passage 41 and an oil passage 50 for exhausting oil are coupled to the line pressure valve 33. In the line pressure valve 33, the driving (position) in the axial direction of the spool 33*a* is controlled in accordance with the line pressure control pressure supplied from the line pressure solenoid valve 32. That is, the spool 33*a* of the line pressure valve 33 is driven in the axial direction in accordance with the balance between a pushing force (line pressure control pressure×pressure receiving area) caused by the line pressure control pressure supplied through the oil passage 48 and a spring force (biasing force) of the spring 33*b*, thereby adjusting the amount of oil exhausted through the oil passage 50 and regulating the line pressure. The oil passage 41 has an oil pressure equivalent to the regulated line pressure.

The line pressure detection sensor 34 is a sensor which detects the line pressure. The line pressure detection sensor 34 is coupled to the oil passage 41. The line pressure detection sensor 34 is coupled to the TCU 10. The line pressure detected by the line pressure detection sensor 34 is outputted to the TCU 10.

Figure 3:
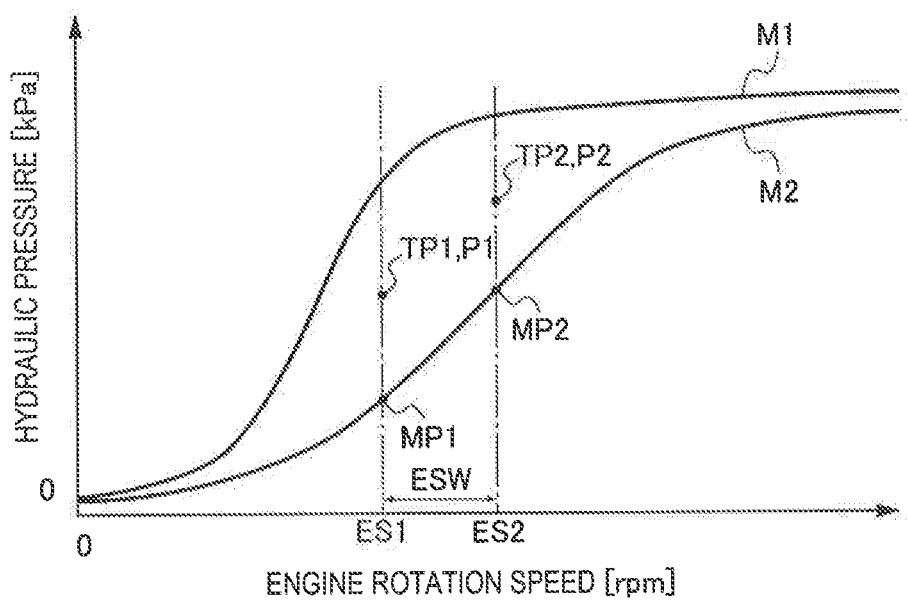
FIG. 3 illustrates the relationship between target line pressures and line pressures (detected values) determined as normal in the abnormality detection device according to the example.
Figure 4:
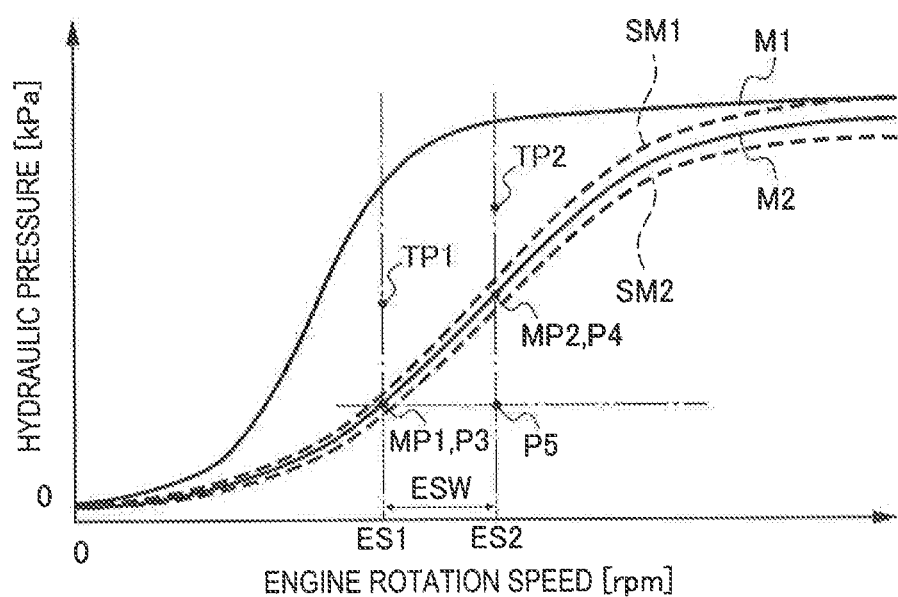
FIG. 4 illustrates the relationship between target line pressures and line pressures (detected values) determined as abnormal in fixation of the half discharge state in the abnormality detection device according to the example.

Now, the abnormality detection device 1 will be explained. Here, the abnormality detection device 1 will be explained with reference to FIG. 3 and FIG. 4 in addition to FIG. 1 and FIG. 2. FIG. 3 illustrates the relationship between target line pressures and line pressures (detected values) determined as normal in the abnormality detection device according to the example. FIG. 4 illustrates the relationship between target line pressures and line pressures (detected values) determined as abnormal in fixation of the half discharge state in the abnormality detection device according to the example.

The abnormality detection device 1 is a device which detects an abnormality of the hydraulic circuit 3. In particular, the abnormality detection device 1 determines whether the switching solenoid valve 30 and/or the switching valve 31 as the switching unit which switches the discharge state has an abnormality which is fixed to the half discharge state side or not. The abnormality detection processing of the abnormality detection device 1 is executed as one function of the TCU 10. In particular, the abnormality detection processing of the abnormality detection device 1 is performed when prescribed conditions are satisfied during normal hydraulic control with respect to the hydraulic circuit 3. The fixation abnormality on the half discharge state side is an abnormality of the switching solenoid valve 30 which is fixed to the on-side when the fixation abnormality occurs in the switching solenoid valve 30, and is an abnormality of the spool 31*a* which is fixed to the side where the oil passage 42 communicates with the oil passage 46 when the fixation abnormality occurs in the switching valve 31.

In the case where the switching solenoid valve 30 and/or the switching valve 31 is fixed to the half discharge state side, the oil passage 42 constantly communicates with the oil passage 46. Accordingly, even when the switching control to the fully discharged state is performed, the oil passage 42 does not communicate with the oil passage 45. In this case, the half discharge state is not switched to the fully discharged state even when the switching control to the fully discharged state is performed, therefore, the line pressure is increased only to a maximum discharge pressure in the half discharge state (the line pressure does not exceed the maximum discharge pressure in the half discharge state). Accordingly, when the pressure regulation control is performed in the abnormality detection processing so that the line pressure becomes a target line pressure which is higher than the maximum discharge pressure in the half discharge state after the switching control to the fully discharged state during a steady operation, whether the line pressure (detected value) approximately corresponds to the maximum discharge pressure in the half discharge state or not is determined to thereby determine whether the switching solenoid valve 30 and/or the switching valve 31 is fixed to the half discharge state side or not.

However, even when the pressure regulation control is performed so that the line pressure becomes a target line pressure which is higher than the maximum discharge pressure in the half discharge state after the switching control to the fully discharged state, the state where the line pressure approximately corresponds to the maximum discharge pressure in the half discharge state may be caused in the case where the line pressure solenoid valve 32 and/or the line pressure valve 33 as the pressure regulator which regulates the line pressure is fixed, the case where the line pressure detection sensor 34 which detects the line pressure is fixed and other cases. When the fixation abnormality exists in the line pressure solenoid valve 32 and/or the line pressure valve 33, or the line pressure detection sensor 34, the line pressure (detected value) does not vary (maintained in a constant value). Accordingly, the fixation of the half discharge state in the switching solenoid valve 30 and/or the switching valve 31 or the fixation in any one of the line pressure solenoid valve 32, the line pressure valve 33 and the line pressure detection sensor 34 is discriminated by determining whether the line pressure (detected value) approximately corresponds to the maximum discharge pressure in the half discharge state or not at two points where the engine rotation speed (the discharge amount of the oil pump 4 or the maximum discharge pressure in the half discharge state) differs in the abnormality detection processing.

The TCU 10 includes a microprocessor which performs operations, a ROM 10a which stores a program for allowing the microprocessor to execute respective processing and so on, a RAM which stores various types of data such as operation results, a backup RAM which stores memory contents by a battery, an input and output I/F and so on.

Various types of sensors including the line pressure detection sensor 34 and an oil temperature detection sensor 15 which detects the temperature of oil (oil temperature) (for example, oil flowing in the oil passage 41) are coupled to the TCU 10. Respective solenoids including the switching solenoid valve 30 and the line pressure solenoid valve 32 are coupled to the TCU 10. The TCU 10 receives information such as an accelerator pedal opening and the engine rotation speed from an ECU (Engine Control Unit) (not shown) which comprehensively controls the engine through a CAN (Controller Area Network). As a method of acquiring the engine rotation speed, for example, a rotation angle of the crank shaft is detected by a crank angle sensor (not shown), and the engine rotation speed is calculated from the rotation angle of the crank shaft in the ECU.

The TCU 10 performs control of continuously varying the gear ratio automatically in accordance with driving states of the vehicle (for example, the accelerator pedal opening, vehicle velocity and so on) while following a shift map. The shift map is stored in the ROM 10a of the TCU 10. In this case, the TCU 10 performs the following control to the respective solenoids 30 and 32 of the hydraulic circuit 3. The TCU 10 determines whether the discharge state of the oil pump 4 is set to the fully discharged state or the half discharge state, supplying a prescribed current to the switching solenoid valve 30 at the time of the half discharge state and stopping the current supply at the time of the fully discharged state. The TCU 10 sets the target line pressure as an instruction value of the line pressure used when performing the pressure regulation control and supplies current necessary for making the line pressure be the target line pressure to the line pressure solenoid valve 32.

The oil pump 4 has the maximum discharge pressure characteristics indicating the maximum discharge pressure at which oil can be discharged in the fully discharged state and the maximum discharge pressure characteristics indicating the maximum discharge pressure at which oil can be discharged in the half discharge state. Respective maximum discharge pressure characteristics are characteristics indicating the maximum discharge pressures varying in accordance with parameters such as the engine rotation speed and the temperature of oil (oil temperature). For example, in the maximum discharge pressure characteristics concerning the engine rotation speed, the higher the engine rotation speed becomes, the higher the maximum discharge pressure becomes. In the maximum discharge pressure characteristics concerning the oil temperature, the higher the oil temperature becomes, the lower the maximum discharge pressure becomes. When the maximum discharge pressure characteristics in the fully discharged state is compared to the maximum discharge pressure characteristics in the half discharge state, the maximum discharge pressure in the fully discharged state is higher than the maximum discharge pressure in the half discharge state in all regions of the engine rotation speed, the oil temperature and so on.

FIG. 3 and FIG. 4 illustrate the maximum discharge pressure characteristics (Map M1) varying in accordance with the engine rotation speed in the fully discharged state and the maximum discharge pressure characteristics (Map M2) varying in accordance with the engine rotation speed in the half discharge state. The following explanation will be made by using the maximum discharge pressure characteristics (two-dimensional maps M1 and M2) varying in accordance with the engine rotation speed.

The ROM 10a (in one implementation, the ROM 10a may serve as a "storage") of the TCU 10 stores the maps M1 and M2 indicating the maximum discharge pressure characteristics in the fully discharged state and the half discharge state. The target line pressure set in the TCU 10 is a hydraulic pressure equal to or lower than the maximum discharge pressure in the fully discharged state in accordance with the engine rotation speed in the map M1 in the case of the fully discharged state, and is a hydraulic pressure equal to or lower than the maximum discharge pressure in the half discharge state in accordance with the engine rotation speed in the map M2 in the case of the half discharge state. When the target line pressure exceeds the maximum discharge pressure in the half discharge state in any engine rotation speed, the TCU 10 performs control of switching the discharge state of the oil pump 4 into the fully discharged state.

In particular, the TCU 10 has a function of detecting an abnormality in the above hydraulic circuit 3. That is why the TCU 10 includes a switching controller 11 (in one implementation, the switching controller 11 may serve as a "switching controller"), a pressure regulation controller 12 (in one implementation, the pressure regulation controller 12 may serve as a "pressure regulation controller") and a determination unit 13 (in one implementation, the determination unit 13 may serve as a "determination unit"). The TCU 10 executes respective functions of the switching controller 11, the pressure regulation controller 12 and the determination unit 13 by the program stored in the ROM 10a being executed by the microprocessor.

The switching controller 11 and the pressure regulation controller 12 are controllers for performing normal hydraulic control (pressure regulation control of the line pressure) with respect to the hydraulic circuit 3. In the following explanation, respective processing of the switching controller 11, the pressure regulation controller 12 and the determination unit 13 at the time of performing abnormality detection during the hydraulic control will be explained. The abnormality detection device 1 (TCU 10) monitors the status of the hydraulic control and performs abnormality detection when prescribed conditions are satisfied during the hydraulic control.

The switching controller 11 performs switching control of the discharge state of the oil pump 4 to the fully discharged state. Specifically, the switching controller 11 stops the current supply to the switching solenoid valve 30 for turning off the switching solenoid valve 30. One of the prescribed conditions in which abnormality detection is performed is that the switching control to the fully discharged state is performed during the normal hydraulic control.

The pressure regulation controller 12 sets a first target line pressure which is higher than the maximum discharge pressure in the half discharge state after the switching control to the fully discharged state, and performs pressure regulation control so that the line pressure becomes the first target line pressure. Specifically, at any engine rotation speed (first engine rotation speed) after the switching control to the fully discharged state is performed by the switching controller 11, the pressure regulation controller 12 extracts the maximum discharge pressure in the fully discharged state corresponding to the first engine rotation speed from the map M1, and extracts the maximum discharge pressure in the half discharge state corresponding to the first engine rotation speed from the map M2. The pressure regulation controller 12 sets a hydraulic pressure between the maximum discharge pressure in the fully discharged state and the maximum discharge pressure in the half discharge state at the first engine rotation speed (hydraulic pressure sufficiently higher than the maximum discharge pressure in the half discharge state at the first engine rotation speed) as the first target line pressure. The pressure regulation controller 12 supplies current necessary for making the line pressure be the first target line pressure to the line pressure solenoid valve 32. One of the prescribed conditions in which abnormality detection is performed is that the pressure regulation control to the target line pressure higher than the maximum discharge pressure in the half discharge state is performed after the switching control to the fully discharged state during normal hydraulic control.

In the case where it is determined that an abnormality exists in the hydraulic circuit 3, the pressure regulation controller 12 sets a second target line pressure higher than the maximum discharge pressure in the half discharge state when the engine rotation speed varies from the first engine rotation speed by a prescribed rotation speed, and the pressure regulation control is performed in an effort to set the line pressure at the second target line pressure. Specifically, in the case where it is determined by the determination unit 13 that the line pressure (detected value) approximately corresponds to the maximum discharge pressure in the half discharge state at the first engine rotation speed, the pressure regulation controller 12 determines whether the engine rotation speed varies from the first engine rotation speed by the prescribed rotation speed or not. The prescribed rotation speed is determined by conformity, which is for example, several hundreds of rpm. The prescribed rotation speed is stored in the ROM 10a of the TCU 10. At the time when the engine rotation speed varies from the first engine rotation speed by the prescribed rotation speed and reaches a second engine rotation speed (=the first engine rotation speed+the prescribed rotation speed, or the first engine rotation speed–the prescribed rotation speed), the pressure regulation controller 12 extracts the maximum discharge pressure in the fully discharged state corresponding to the second engine rotation speed from the map M1 and extracts the maximum discharge pressure in the half discharge state corresponding to the second engine rotation speed from the map M2. The pressure regulation controller 12 sets a hydraulic pressure between the maximum discharge pressure in the fully discharged state and the maximum discharge pressure in the half discharge state at the second engine rotation speed (hydraulic pressure sufficiently higher than the maximum discharge pressure in the half discharge state at the second engine rotation speed) as the second target line pressure. The pressure regulation controller 12 supplies current necessary for making the line pressure be the second target line pressure to the line pressure solenoid valve 32.

In the instance shown in FIG. 3 and FIG. 4, the hydraulic pressure represented by a symbol TP1 is the first target line pressure and the hydraulic pressure represented by a symbol TP2 is the second target line pressure. The engine rotation speed represented by a symbol ES1 is the first engine rotation speed, the engine rotation speed represented by a symbol ES2 is the second engine rotation speed and an interval represented by a symbol ESW is the prescribed rotation speed. The hydraulic pressure represented by a symbol MP1 is the maximum discharge pressure in the half discharge state at the first engine rotation speed and the hydraulic pressure represented by a symbol MP2 is the maximum discharge pressure in the half discharge state at the second engine rotation speed.

The determination unit 13 determines whether an abnormality exists in the hydraulic circuit 3 or not after the pressure regulation control using the first target line pressure. Specifically, the determination unit 13 determines whether the line pressure detected by the line pressure detection sensor 34 approximately corresponds to the maximum discharge pressure in the half discharge state at the first engine rotation speed after performing the pressure regulation control using the first target line pressure by the pressure regulation controller 12. When the line pressure (detected value) approximately corresponds to the maximum discharge pressure in the half discharge state at the first engine speed (when the line pressure (detected value) is deviated from the first target line pressure), the determination unit 13 determines that an abnormality exists the hydraulic circuit 3 and stores the first engine rotation speed in the RAM. On the other hand, when the line pressure (detected value) does not approximately correspond to the maximum discharge pressure in the half discharge state at the first engine speed (when the line pressure (detected value) approximately corresponds to the first target line pressure), the determination unit 13 determines the hydraulic circuit 3 as normal. It is also preferable to determine whether the line pressure (detected value) approximately corresponds to the first target line pressure in the case where the line pressure (detected value) does not approximately correspond to the maximum discharge pressure in the half discharge state at the first engine speed and to determine that the hydraulic circuit 3 as normal when the line pressure approximately corresponds to the first target line pressure.

When it is determined that an abnormality exists in the hydraulic circuit 3, the determination unit 13 determines (discriminates) whether the fixation abnormality of the half discharge state exists in the switching solenoid valve 30 and/or the switching valve 31 or not after the pressure regulation control using the second target line pressure.

Specifically, after performing the pressure regulation control using the second target line pressure by the pressure control controller 12, the determination unit 13 determines whether the line pressure detected by the line pressure detection sensor 34 approximately corresponds to the maximum discharge pressure in the half discharge state at the second engine rotation speed or not. When the line pressure (detected value) approximately corresponds to the maximum discharge pressure in the half discharge state at the second engine rotation speed (the line pressure (detected value) approximately corresponds to the maximum discharge pressure in the half discharge state at two different points of engine rotation speeds), the determination unit 13 determines that the fixation abnormality of the half discharge state exists in the switching solenoid valve 30 and/or the switching valve 31. On the other hand, when the line pressure (detected value) does not approximately corresponds to the maximum discharge pressure in the half discharge state at the second engine rotation speed, the determination unit 13 determines that an abnormality exists in a different device in the hydraulic circuit 3, and that a fixation abnormality exists in any one of, for example, the line pressure solenoid valve 32, the line pressure valve 33 and the line pressure detection sensor 34.

Whether the line pressure (detected value) approximately corresponds to the maximum discharge pressure in the half discharge state or not is determined by using the maps SM1 and SM2 for thresholds illustrated in FIG. 4 and by setting a threshold on a higher side (a hydraulic pressure slightly higher than the maximum discharge pressure in the half discharge state) and a threshold on a lower side (a hydraulic pressure slightly lower than the maximum discharge pressure in the half discharge state) corresponding to the engine rotation speeds from the maps SM1 and SM2, based on whether the line pressure (detected value) is within a range between the two thresholds or not. The map SM1 is a map including hydraulic pressures which are prescribed amounts higher than the maximum discharge pressures indicated by the map M2 varying in accordance with the engine rotation speed. The map SM2 is a map including hydraulic pressures which are prescribed amounts lower than the maximum discharge pressures indicated by the map M2 varying in accordance with the engine rotation speed. The prescribed amounts are determined by conformity, which may be, for example, a fixed amount as well as amounts gradually increasing in accordance with the increase of the engine rotation speed as illustrated in FIG. 4. The maps SM1 and SM2 for thresholds are stored in the ROM 10a of the TCU 10.

In the instance illustrated in FIG. 3, the line pressure detected by the line pressure detection sensor 34 after the pressure regulation control using the first target line pressure TP1 was a hydraulic pressure P1. The line pressure (detected value) P1 approximately corresponds to the first target line pressure TP1. Accordingly, the line pressure P1 is regulated to the first target line pressure TP1 which is higher than the maximum discharge pressure MP1 in the half discharge state at the first engine rotation speed ES1, therefore, the discharge state is normally switched to the fully discharged state in the hydraulic circuit 3. In this case, the determination unit 13 determines the hydraulic circuit 3 as normal. Incidentally, as the hydraulic circuit 3 is normal, a line pressure P2 detected by the line pressure detection sensor 34 approximately corresponds to the second target line pressure TP2 also when the pressure regulation control is performed by using the second target line pressure TP2.

In the instance illustrated in FIG. 4, the line pressure detected by the line pressure detection sensor 34 after the pressure regulation control using the first target line pressure TP1 was a hydraulic pressure P3. The line pressure (detected value) P3 approximately corresponds to the maximum discharge pressure MP1 in the half discharge state at the first engine rotation speed ES1. Therefore, the line pressure P3 increases only to the maximum discharge pressure MP1 in the half discharge state even when switching control to the fully discharged state is performed. In this case, the determination unit 13 determines that the hydraulic circuit 3 is abnormal. In this stage, the line pressure (detected value) P3 may approximately correspond to the maximum discharge pressure MP1 in the half discharge state due to the fixation in any one of the line pressure solenoid valve 32, the line pressure valve 33 and the line pressure detection sensor 34, in addition to the fixation of the half discharge state in the switching solenoid valve 30 and/or the switching valve 31.

Furthermore, the line pressure detected by the line pressure detection sensor 34 after the pressure regulation control using the second target line pressure TP2 was a hydraulic pressure P4. The line pressure (detected value) P4 approximately corresponds to the maximum discharge pressure MP2 in the half discharge state at the second engine rotation speed ES2. Therefore, the line pressures P3 and P4 increase only to the maximum discharge pressures MP1 and MP2 in the half discharge state (at two points of the first engine rotation speed ES1 and the second engine rotation speed ES2) even when the engine rotation speed (and the discharge amount of the oil pump 4 or the maximum discharge pressure in the half discharge state) varies. In this case, the determination unit 13 determines that the fixation abnormality in the half discharge state exists in the switching solenoid valve 30 and/or the switching valve 31. In the case of the fixation abnormality of the half discharge state occurs in the switching solenoid valve 30 and/or the switching valve 31 as described above, the line pressure varies along the maximum discharge pressure characteristics in the half discharge state (map M2) in accordance with variation of the engine rotation speed. In the case of the instance, if the fixation occurs in any one of the line pressure solenoid valve 32, the line pressure valve 33 and the line pressure detection sensor 34, the line pressure (detected value) P3 at the first engine rotation speed ES1 approximately corresponds to a line pressure (detected value) P5 at the second engine rotation speed ES2, and the line pressure does not vary.

The abnormality detection processing is performed when the control of switching into the fully discharged state during the steady operation (normal hydraulic control) of the vehicle as well as when the pressure regulation control is performed by setting the hydraulic pressure a prescribed amount higher than the maximum discharge pressure in the half discharge state as the target line pressure. It is preferable to execute the abnormality detection processing when the difference of hydraulic pressures between the maximum discharge pressure in the fully discharged state in the map M1 and the maximum discharge pressure in the half discharge state in the map M2 for setting the suitable target line pressures at two points of engine rotation speeds which are different by a prescribed rotation speed.

In the case where the TCU 10 determines that the fixation abnormality in the half discharge state exists in the switching solenoid valve 30 and/or the switching valve 31 or that the abnormality exists in the hydraulic circuit 3, it is preferable to display a message for reporting the abnormality on an on-vehicle display, to output the voice of the message reporting the abnormality and to turn on an alarm lamp for informing a driver of the abnormality. The information reporting the abnormality (for example, a diagnosis code) is preferably stored in the TCU 10 and the like.

Operations of the abnormality detection device 1 will be explained following a flowchart in FIG. 5.

Figure 5:
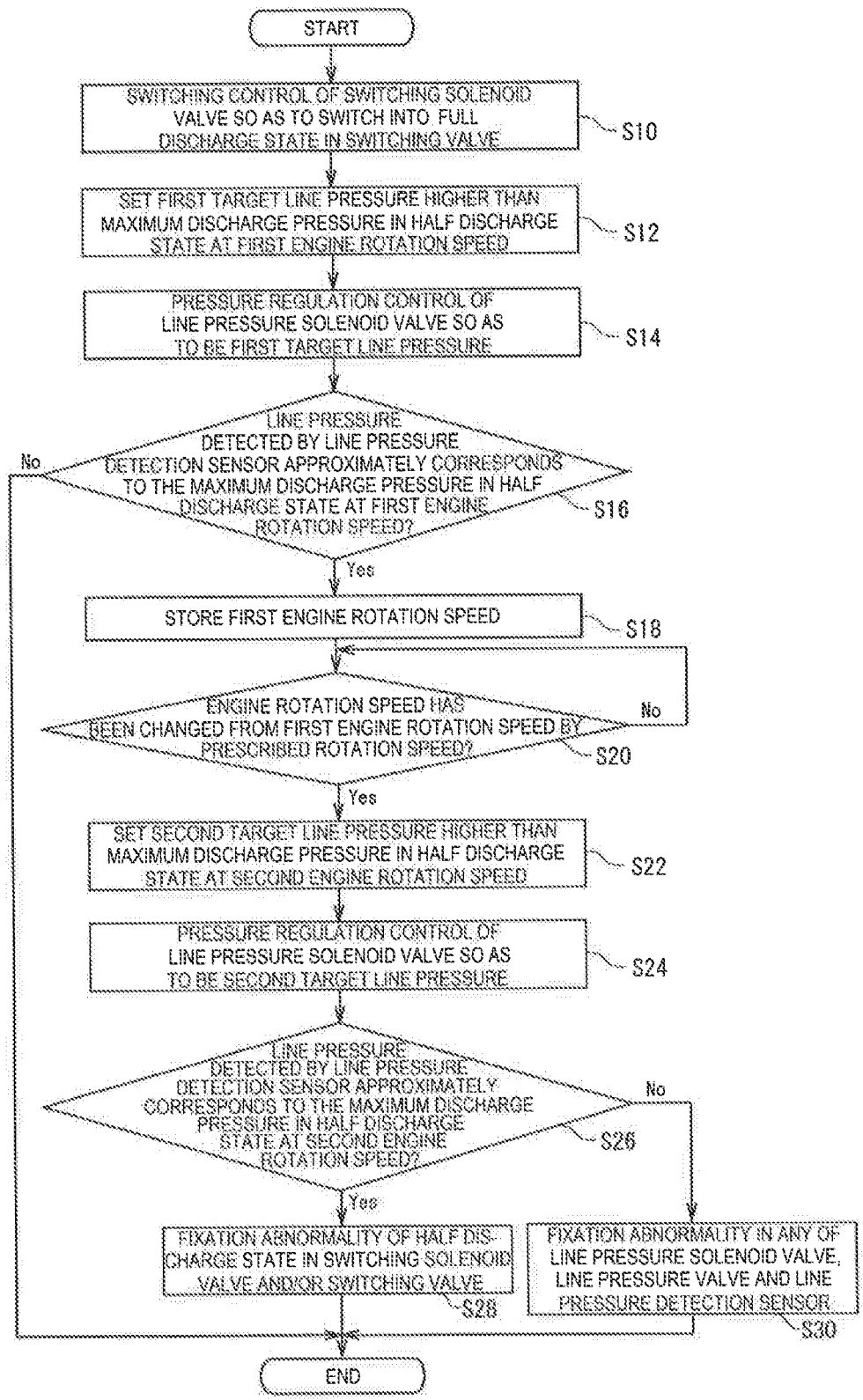
FIG. 5 is a flowchart indicating the flow of abnormality detection processing in the abnormality detection device according to the example.

FIG. 5 is the flowchart indicating the flow of abnormality detection processing in the abnormality detection device according to the example. The processing is performed when the above conditions are satisfied during the steady operation of the vehicle.

The TCU 10 stops the supply of current to the switching solenoid valve 30 for turning off the switching solenoid valve 30 (Step S10). The switching solenoid valve 30 is turned off when the supply of current is stopped and does not generate the switching control pressure in the normal operation. On the other hand, the switching solenoid valve 30 is not turned off even when the supply of current is stopped and supplies the switching control pressure to the switching valve 31 in the case where fixation to the half discharge state side occurs (namely, on-fixation occurs). In this case, the operation state of the oil pump 4 is the half discharge state in which oil is discharged to the oil passage 41 only from the first discharge port 4*b*. The spool 31*a* of the switching valve 31 normally moves to the place where the oil passage 42 communicates with the oil passage 45 when the switching control pressure is not supplied. In this case, the operation state of the oil pump 4 is switched into the fully discharged state in which oil is discharged to the oil passage 41 from the first discharge port 4*b* and the second discharge port 4*c*. On the other hand, in the case where the switching valve 31 is fixed to the half discharge state side (namely, in the case where the spool 31*a* is fixed to the side where the oil passage 42 communicates with the oil passage 46), the spool 31*a* of the switching valve 31 does not move to the place where the oil passage 42 communicates with the oil passage 45 even when the supply of the switching control pressure is stopped. In this case, the operation state of the oil pump 4 is constantly the half discharge state. The processing in Step S10 is processing performed in normal hydraulic pressure control.

The TCU 10 sets the first target line pressure which is higher than the maximum discharge pressure in the half discharge state at the first ending rotation speed by using the maps M1 and M2 (Step S12). Then, the TCU 10 supplies the current necessary for making the line pressure be the first target line pressure to the line pressure solenoid valve 32 (Step S14). The line pressure solenoid valve 32 generates the line pressure control pressure corresponding to the supplied current, and supplies the line pressure control pressure to the line pressure valve 33 through the oil passage 48. In the line pressure valve 33, the spool 33*a* moves in accordance with the supplied line pressure control pressure and oil is discharged through the oil passage 50 in accordance with the position of the spool 33*a* to regulate the line pressure so as to be the first target line pressure. Respective processing in Steps S12 and S14 are performed in normal hydraulic control.

In the case where the switching solenoid valve 30 is normal as well as the switching valve 31 is normal at this time, the operation state of the oil pump 4 is switched to the fully discharged state, therefore, the line pressure exceeds the maximum discharge pressure in the half discharge state at the first engine rotation speed to reach the first target line pressure. On the other hand, in the case where the fixation abnormality of the half discharge state exists in the switching solenoid valve 30 and/or the switching valve 31, the operation state of the oil pump 4 is not switched to the fully discharged state (kept in the half discharge state), the line pressure is limited up to the maximum discharge pressure in the half discharge state at the first engine rotation speed and does not increase to the first target line pressure. When the fixation abnormality exists in the line pressure solenoid valve 32 and/or the line pressure valve 33, the line pressure is held in a fixed value. When the fixation abnormality exists in the line detection sensor 34, the constant line pressure is outputted in the line pressure sensor 34.

The TCU 10 determines whether the line pressure detected by the line pressure detection sensor 34 approximately corresponds to the maximum discharge pressure in the half discharge state at the first engine rotation speed or not (Step S16). When it is determined that the line pressure (detected value) approximately corresponds to the maximum discharge pressure in the half discharge state in Step S16, the TCU 10 determines that an abnormality exists in the hydraulic circuit 3 and stores the first engine rotation speed (Step S18). On the other hand, when it is determined that the line pressure (detected value) does not approximately correspond to the maximum discharge pressure in the half discharge state in Step S16, the hydraulic circuit 3 (the switching solenoid valve 30, the switching valve 31, the line pressure solenoid valve 32, the line pressure valve 33 and the line pressure detection sensor 34) is determined as normal, and the processing ends.

After the first engine rotation speed is stored, the TCU 10 determines whether the engine rotation speed has been changed from the first engine rotation speed by the prescribed rotation speed or not (Step S20). When it is determined that the engine rotation speed has not been changed from the first engine rotation speed by the prescribed rotation speed, the process returns to the determination of the TCU 10 in Step S20.

When it is determined that the engine rotation speed has been changed from the first engine rotation speed by the prescribed rotation speed (when the engine rotation speed reaches the second engine rotation speed) in Step S20, the TCU 10 sets the second target line pressure which is higher than the maximum discharge pressure in the half discharge state at the second engine rotation speed by using the maps M1 and M2 (Step S22). Then, the TCU 10 supplies the current necessary for making the line pressure be the second target line pressure to the line pressure solenoid valve 32 (Step S24). The line pressure solenoid valve 32 and the line pressure valve 33 operate in the same manner as the above operations, regulating the line pressure so as to be the second target line pressure. Respective processing of the Steps S22 and S24 are performed in the normal hydraulic control.

In this case, when the fixation abnormality of the half discharge state exists in the switching solenoid valve 30 and/or the switching valve 31, the operation state of the oil pump 4 is not switched to the fully discharged state, therefore, the line pressure is limited to the maximum discharge pressure in the half discharge state at the second engine rotation speed and does not reach the second target line pressure.

The TCU 10 determines whether the line pressure detected in the line pressure detection sensor 34 approximately corresponds to the maximum discharge pressure in the half discharge state at the second engine rotation speed or not (Step S26). When it is determined that the line pressure (detected value) approximately corresponds to the maximum discharge pressure in the half discharge state in Step S26, the TCU 10 determines that the fixation abnormality of the half discharge state exists in the switching solenoid valve 30 and/or the switching valve 31 (Step S28). Then, the processing ends. On the other hand, when it is determined that the line pressure (detected value) does not approximately correspond to the maximum discharge pressure in the half discharge state in Step S26, the TCU 10 determines that the fixation abnormality exists in any one of the line pressure solenoid valve 32, the line pressure valve 33 and the line pressure detection sensor 34 (Step S30). Then, the processing ends.

In the abnormality detection device 1 according to the example, the maximum discharge pressure in the half discharge state (characteristics of the maximum discharge pressure which varies in accordance with the engine rotation speed and so on) is used to thereby effectively determine the fixation abnormality of the half discharge state in the switching solenoid valve 30 and/or the switching valve 31 in the case where the line pressure (detected value) approximately corresponds to the maximum discharge pressure in the half discharge state (in the case where the line pressure increases only to the maximum discharge pressure in the half discharge state) even when performing control of switching to the fully discharged state. In this case, the abnormality detection device 1 can detect an abnormality during the steady operation of the vehicle (during the normal hydraulic control). The abnormality detection processing can be executed during the steady operation of the vehicle. The determination method in the abnormality detection processing is the direct determination method in which the actual line pressure (detected value) is compared with the maximum discharge pressure in the half discharge state after the pressure regulation control, therefore, the accuracy of determination is high.

In the abnormality detection device 1 according to the example, it is possible to discriminate between the fixation abnormality of the half discharge state occurring in the switching solenoid valve 30 and/or the switching valve 31 and the fixation abnormality in any one of the line pressure solenoid valve 32, the line pressure valve 33 and the line pressure detection sensor 34 by determining whether the line pressure (detected value) approximately corresponds to the maximum discharge pressure in the half discharge state or not at plural points where the engine rotation speed differs, therefore, the fixation abnormality of the half discharge state in the switching solenoid valve 30 and/or the switching valve 31 can be determined more accurately. Also in the abnormality detection device 1 according to the example, determination at plural points where the discharge amount (the maximum discharge pressure in the half discharge state) of the oil pump 4 differs can be easily made by using the engine rotation speed as a parameter.

In the abnormality detection device 1 according to the example, it is possible to set the suitable target line pressure in a range not exceeding the maximum discharge pressure in the fully discharged state by setting the hydraulic pressure between the maximum discharge pressure in the half discharge state and the maximum discharge pressure in the fully discharged state as the target line pressure. Also in the abnormality detection device 1 according to the example, the suitable target line pressure corresponding to the engine rotation speed and so on can be set by using the maximum discharge pressure characteristics in the half discharge state (for example, the map M2) which vary in accordance with the engine rotation speed and so on and the maximum discharge pressure characteristics in the fully discharged state (for example, the map M1) which vary in accordance with the engine rotation speed and so on.

The example of the present invention has been explained as the above, and the present invention is not limited to the above example and various modifications may occur. For example, the present invention is applied to the hydraulic circuit 3 of the chain-type CVT 2 mounted on the vehicle, however, the present invention can be applied to hydraulic circuits of belt-type and toroidal-type CVTs, other automatic transmissions such as AT and DCT, apparatuses other than the automatic transmissions, and hydraulic circuits of apparatuses mounted on other mechanisms other than vehicles. In the above example, the present invention is applied to the vehicle using the engine as a drive source, however, the present invention can be also applied to an electric car, a hybrid car and so on having an electric motor as a drive source.

Although the switching solenoid valve 30 and the switching valve 31 are adopted as the switching unit in the above example, the switching unit is not limited to the structure using the on/off solenoid valve and the spool valve. Moreover, the line pressure solenoid valve 32 and the line pressure valve 33 are adopted as the pressure regulator in the above example, however, the pressure regulator is not limited to the structure using the linear solenoid valve and the spool valve.

The present invention is applied to the oil pump 4 having two discharge ports 4b and 4c in the above example, however, the present invention may be applied to oil pumps having three of more discharge ports.

The structure in which the hydraulic pressure between the maximum discharge pressure in the fully discharged state and the maximum discharge pressure in the half discharge state is set as the target line pressure by using the maximum discharge pressure characteristics in the fully discharged state (map M1) and the maximum discharge pressure characteristics in the half discharge state (map M2) is adopted in the above example, however, it is also preferable that a target line pressure higher than the maximum discharge pressure in the half discharge state is set by using only the maximum discharge pressure characteristics in the half discharge state (map M2).

The above example has been explained by using the maximum discharge pressure characteristics varying in accordance with the engine rotation speed (two-dimensional maps M1 and M2), however, a three-dimensional map indicating the maximum discharge characteristics varying in accordance with the engine rotation speed and the oil temperature may be used as well as a four-dimensional map including other parameters affecting the hydraulic pressure other than the engine rotation speed and the oil temperature may be used.

The structure in which the fixation abnormality of the half discharge state in the switching solenoid valve 30 and/or the switching valve 31 is determined by using two points of the first engine rotation speed and the second engine rotation speed is adopted in the above example, however, the determination may be made by using one point or three points where the engine rotation speed differs. For example, in the case of making a determination at one point, the fixation abnormality of the half discharge state in the switching solenoid valve 30 and/or the switching valve 31 is determined in the case where the line pressure (detected value) approximately corresponds to the maximum discharge pressure in the half discharge state at any engine rotation speed after the pressure regulation control is performed so that the line pressure becomes the target line pressure higher than the maximum discharge pressure in the half discharge state at any engine rotation speed after the switching control to the fully discharged state is performed.

The structure in which the engine rotation speed is used as the parameter and determination is made at two points where the engine rotation speed differs is adopted in the above example, however, it is also preferable to make a determination by using other parameters whereby the discharge amount from the oil pump 4 (the maximum discharge amount in the half discharge state) varies instead of the engine rotation speed, and for example, the rotation speed (rotation velocity) of the oil pump 4 may be used as well as the rotation speed of the electric motor may be used in the case of the vehicle having the electric motor as the drive source. As for the oil pump 4, pumps other than one driven by the power of the engine may be adopted, and for example, an electric oil pump may be adopted.

The structure in which detection of an abnormality is performed when prescribed conditions are satisfied during the steady operation (during normal hydraulic control) of the vehicle is adopted in the above example, however, the detection of the abnormality may be performed by performing hydraulic control (switching control to the fully discharged state, pressure regulation control to the target line pressure higher than the maximum discharge pressure in the half discharge state and so on) for detecting the abnormality at particular timing such as at the time of starting the vehicle, at the time of stopping the vehicle or at regular time intervals.

According to the example of the present invention, fixation of the partially discharged state in the switching unit which switches between the fully discharged state and the partially discharged state of the oil pump can be detected with high accuracy.

The invention claimed is:

1. An abnormality detection device for a hydraulic circuit comprising an oil pump capable of increasing a pressure of oil sucked through a suction port and discharging the oil through discharge ports, a switching unit that switches between a fully discharged state where oil is discharged to an oil passage through all the discharge ports and a partially discharged state where oil is discharged to the oil passage through part of the discharge ports, a pressure regulator that regulates a pressure of oil discharged in the oil passage in either one of the discharge states switched by the switching unit, a pressure regulation controller that controls the pressure regulation of the pressure regulator and a hydraulic detector that detects a hydraulic pressure regulated by the pressure regulator, the device comprising:
a storage that stores a maximum discharge pressure of oil that is allowed to the discharged in the partially discharged state;
a switching controller that performs switching control to switch to the fully discharged state by the switching unit; and
a determination unit that determines that the switching unit has a fixation abnormality of the partially discharged state when a hydraulic pressure detected by the hydraulic detector approximately corresponds to the stored maximum discharge pressure in the partially discharged state in a state where, in conjunction with the switching control performed by the switching control unit directed towards switching to the fully discharged state, the pressure regulation controller sets a target hydraulic pressure to a hydraulic pressure higher than the maximum discharge pressure in the partially discharged state stored in the storage, and performs pressure regulation control on the pressure regulator in an effort to achieve the target hydraulic pressure.

2. The abnormality detection device for the hydraulic circuit according to claim 1, wherein
the storage stores a maximum discharge pressure of oil that is allowed to be discharged in the fully discharged state, and
the determination unit determines that the switching unit has a fixation abnormality in the partially discharged state when a hydraulic pressure detected by the hydraulic detector approximately corresponds to the maximum discharge pressure in the partially discharged state in a state where the pressure regulation controller sets the target hydraulic pressure to a hydraulic pressure between the maximum discharge pressure in the partially discharged state stored in the storage and the maximum discharge pressure in the fully discharged state stored in the storage and performs pressure regulation control on the pressure regulator in an effort to achieve the target hydraulic pressure.

3. The abnormality detection device for the hydraulic circuit according to claim 1,
wherein the determination unit determines that the switching unit has a fixation abnormality of the partially discharged state when, in a state where the pressure regulation controller sets a first target hydraulic pressure higher than the maximum discharge pressure in the partially discharged state at a first discharge amount of the oil pump and performs the pressure regulation control on the pressure regulator in an effort to achieve the first target hydraulic pressure, a hydraulic pressure detected by the hydraulic detector approximately corresponds to the maximum discharge pressure in the partially discharged state at the first discharge amount as well as when, in a state where the pressure regulation controller sets a second target hydraulic pressure higher than the maximum discharge pressure in the partially discharged state at a second discharge amount different from the first discharge amount by a prescribed amount and performs the pressure regulation control on the pressure regulator in an effort to achieve the second target hydraulic pressure, a hydraulic pressure detected by the hydraulic detector approximately corresponds to the maximum discharge pressure in the partially discharged state at the second discharge amount.

4. The abnormality detection device for the hydraulic circuit according to claim 2,
wherein the determination unit determines that the switching unit has a fixation abnormality of the partially discharged state when, in a state where the pressure regulation controller sets a first target hydraulic pressure higher than the maximum discharge pressure in the partially discharged state at a first discharge amount of the oil pump and performs the pressure regulation control on the pressure regulator in an effort to achieve the first target hydraulic pressure, a hydraulic pressure detected by the hydraulic detector approximately corresponds to the maximum discharge pressure in the partially discharged state at the first discharge amount as well as when, in a state where the pressure regulation controller sets a second target hydraulic pressure higher than the maximum discharge pressure in the partially discharged state at a second discharge amount different from the first discharge amount by a prescribed amount and performs the pressure regulation control on the pressure regulator in an effort to achieve the second target hydraulic pressure, a hydraulic pressure detected by the hydraulic detector approximately corresponds to the maximum discharge pressure in the partially discharged state at the second discharge amount.

5. The abnormality detection device for the hydraulic circuit according to claim 3, wherein
the hydraulic circuit is a hydraulic circuit mounted on a vehicle that uses an engine as a drive source,
the oil pump has a maximum discharge pressure characteristic indicating the maximum discharge pressure in the partially discharged state, which varies according to a number of engine revolutions,
the storage stores the maximum discharge pressure characteristic in the partially discharged state, which varies according to the number of engine revolutions, and directed towards switching to the fully discharged state, the pressure regulation controller partially discharged state when, in a state where the pressure regulation controller sets a first target hydraulic pressure higher than the maximum discharge pressure in the partially discharged state at a first number of engine revolutions acquired from the maximum discharge pressure characteristic in the partially discharged state stored in the storage and performs the pressure regulation control on the pressure regulator in an effort to achieve the first target hydraulic pressure, a hydraulic pressure detected by the hydraulic detector approximately corresponds to the maximum discharge pressure in the partially discharged state at the first number of engine revolutions, as well as when, in a state where the pressure regulation controller sets a second target hydraulic pressure higher than the maximum discharge pressure in the partially discharged state at a second number of engine revolutions different from the first number of engine revolutions by a prescribed number of engine revolutions, which is acquired from the maximum discharge pressure characteristic in the partially discharged state shred in the storage and performs the pressure regulation control on the pressure regulator in an effort to achieve the second target hydraulic pressure, a hydraulic pressure detected by the hydraulic detector approximately corresponds to the maximum discharge pressure in the partially discharged state at the second number of engine revolutions.

6. The abnormality detection device for the hydraulic circuit according to claim 4, wherein
the hydraulic circuit is a hydraulic circuit mounted on a vehicle that uses an engine as a drive source,
the oil pump has a maximum discharge pressure characteristic indicating the maximum discharge pressure in the partially discharged state, which varies according to a number of engine revolutions,
the storage stores the maximum discharge pressure characteristic in the partially discharged state varying in accordance with the number of engine revolutions, and
the determination unit determines that the switching unit has a fixation abnormality of the partially discharged state when, in a state where the pressure regulation controller sets a first target hydraulic pressure higher than the maximum discharge pressure in the partially discharged state at a first number of engine revolutions acquired from the maximum discharge pressure characteristic in the partially discharged state stored in the storage and performs the pressure regulation control on the pressure regulator in an effort to achieve the first target hydraulic pressure, a hydraulic pressure detected by the hydraulic detector approximately corresponds to the maximum discharge pressure in the partially discharged state at the first number of engine revolutions, as well as when, in a state where the pressure regulation controller sets a second target hydraulic pressure higher than the maximum discharge pressure in the partially discharged state at a second number of engine revolutions different from the first number of engine revolutions by a prescribed number of engine revolutions, which is acquired from the maximum discharge pressure characteristic in the partially discharged state stored in the storage, and performs the pressure regulation control on the pressure regulator in an effort to achieve the second target hydraulic pressure, a hydraulic pressure detected by the hydraulic detector approximately corresponds to the maximum discharge pressure in the partially discharged state at the second number of engine revolutions.

7. The abnormality detection device for the hydraulic circuit according to claim 1, wherein
the switching unit includes a solenoid valve and a spool valve, and switches between the fully discharged state and the partially discharged state by opening/closing the spool valve by a control pressure supplied from the solenoid valve, and
the determination unit determines whether at least one of the solenoid valve or the spool valve has a fixation abnormality of the partially discharged state.

8. The abnormality detection device for the hydraulic circuit according to claim 2, wherein
the switching unit includes a solenoid valve and a spool valve, and switches between the fully discharged state and the partially discharged state by opening/closing the spool valve by a control pressure supplied from the solenoid valve, and
the determination unit determines whether at least one of the solenoid valve or the spool valve has a fixation abnormality of the partially discharged state.

9. The abnormality detection device for the hydraulic circuit according to claim 3, wherein
the switching unit includes a solenoid valve and a spool valve, and switches between the fully discharged state and the partially discharged state by opening/closing the spool valve by a control pressure supplied from the solenoid valve, and
the determination unit determines whether at least one of the solenoid valve or the spool valve has a fixation abnormality of the partially discharged state.

10. The abnormality detection device for the hydraulic circuit according to claim 4, wherein
the switching unit includes a solenoid valve and a spool valve, and switches between the fully discharged state and the partially discharged state by opening/closing the spool valve by a control pressure supplied from the solenoid valve, and
the determination unit determines whether at least one of the solenoid valve or the spool valve has a fixation abnormality of the partially discharged state.

11. The abnormality detection device for the hydraulic circuit according to claim 5, wherein
the switching unit includes a solenoid valve and a spool valve, and switches between the fully discharged state and the partially discharged state by opening/closing the spool valve by a control pressure supplied from the solenoid valve, and
the determination unit determines whether at least one of the solenoid valve or the spool valve has a fixation abnormality of the partially discharged state.

12. The abnormality detection device for the hydraulic circuit according to claim 6, wherein
the switching unit includes a solenoid valve and a spool valve, and switches between the fully discharged state and the partially discharged state by opening/closing the spool valve by a control pressure supplied from the solenoid valve, and
the determination unit determines whether at least one of the solenoid valve or the spool valve has a fixation abnormality of the partially discharged state.

13. The abnormality detection device for the hydraulic circuit according to claim 1, wherein
the switching controller performs the switching control to switch to the fully discharged state at prescribed timing for making a determination of the fixation abnormality of the partially discharged state by the determination unit, and
the pressure regulation controller performs the pressure regulation control so that the hydraulic pressure reaches the target hydraulic pressure higher than the maximum discharge pressure in the partially discharged state, after the switching control.

14. The abnormality detection device for the hydraulic circuit according to claim 2,
   wherein the switching controller performs the switching control to switch to the fully discharged state at prescribed timing for making a determination of the fixation abnormality of the partially discharged state by the determination unit, and
   the pressure regulation controller performs the pressure regulation control so that the hydraulic pressure reaches the target hydraulic pressure higher than the maximum discharge pressure in the partially discharged state, after the switching control.

15. The abnormality detection device for the hydraulic circuit according to claim 3,
   wherein the switching controller performs the switching control to switch to the fully discharged state at prescribed timing for making a determination of the fixation abnormality of the partially discharged state by the determination unit, and
   the pressure regulation controller performs the pressure regulation control so that the hydraulic pressure reaches the target hydraulic pressure higher than the maximum discharge pressure in the partially discharged state, after the switching control.

16. The abnormality detection device for the hydraulic circuit according to claim 4,
   wherein the switching controller performs the switching control to switch to the fully discharged state at prescribed timing for making a determination of the fixation abnormality of the partially discharged state by the determination unit, and
   the pressure regulation controller performs the pressure regulation control so that the hydraulic pressure reaches the target hydraulic pressure higher than the maximum discharge pressure in the partially discharged state, after the switching control.

17. The abnormality detection device for the hydraulic circuit according to claim 5,
   wherein the switching controller performs the switching control to switch to the fully discharged state at prescribed timing for making a determination of the fixation abnormality of the partially discharged state by the determination unit, and
   the pressure regulation controller performs the pressure regulation control so that the hydraulic pressure reaches the target hydraulic pressure higher than the maximum discharge pressure in the partially discharged state, after the switching control.

18. The abnormality detection device for the hydraulic circuit according to claim 6,
   wherein the switching controller performs the switching control to switch to the fully discharged state at prescribed timing for making a determination of the fixation abnormality of the partially discharged state by the determination unit, and
   the pressure regulation controller performs the pressure regulation control so that the hydraulic pressure reaches the target hydraulic pressure higher than the maximum discharge pressure in the partially discharged state, after the switching control.

19. An abnormality detection method for a hydraulic circuit comprising an oil pump capable of increasing a pressure of o l sucked through a suction port and discharging the oil through discharge ports, a switching unit that switches between a fully discharged state where oil is discharged to an oil passage through all the discharge ports and a partially discharged state where oil is discharged to the oil passage through part of the discharge ports, a pressure regulator that regulates a pressure of oil discharged in the oil passage in either one of the discharge states switched by the switching unit, a pressure regulation controller that controls the pressure regulation of the pressure regulator and a hydraulic detector that detects a hydraulic pressure regulated by the pressure regulator, the method comprising:
   performing switching control in an effort to switch to the fully discharged state by the switching unit; and
   determining that the switching unit has a fixation abnormality of the partially discharged state when a hydraulic pressure detected by the hydraulic detector approximately corresponds to the maximum discharge pressure in the partially discharged state in a state where, in conjunction with the switching control performed by the switching control unit directed at achieving the fully discharged state, the pressure regulation controller sets a target hydraulic pressure to a hydraulic pressure higher than the maximum discharge pressure in the partially discharged state stored in the storage, and performs pressure regulation control on the pressure regulator in an effort to achieve the target hydraulic pressure.

20. The abnormality detection device according to claim 1, wherein the storage, determination unit and switching controller are components of a transmission control unit, and wherein the determination unit initiates operation in association with a sensed need by the transmission control unit to switch, during steady operation of the hydraulic circuit, from the partially discharged state to the fully discharged state.

21. The abnormality detection device according to claim 1, wherein the pressure regulation controller controls pressure of oil in a portion of the oil passage that feeds directly into a transmission housing that is partially defined by a transmission unit adjustable component.

* * * * *